Figure 1A:
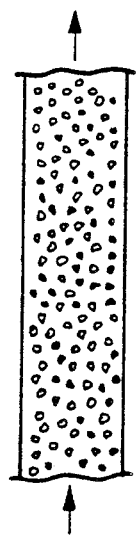

United States Patent [19]

Bengtsson

[11] Patent Number: 5,063,043
[45] Date of Patent: Nov. 5, 1991

[54] PROCESS IN THE PRODUCTION OF HYDROGEN PEROXIDE

[75] Inventor: Erik A. Bengtsson, Surte, Sweden

[73] Assignee: Eka Nobel AB, Surte, Sweden

[21] Appl. No.: 483,770

[22] Filed: Feb. 23, 1990

[30] Foreign Application Priority Data

Feb. 23, 1989 [SE] Sweden .................. 8900636

[51] Int. Cl.⁵ .......................... C01B 15/023
[52] U.S. Cl. ............................. 423/588
[58] Field of Search ........................ 423/588

[56] References Cited

U.S. PATENT DOCUMENTS

| 3,009,782 | 11/1961 | Porter | 423/588 |
| 3,755,552 | 8/1973 | Lee et al. | |
| 4,039,430 | 8/1977 | Jensen | |
| 4,428,922 | 1/1984 | Hopkins | 423/588 |

FOREIGN PATENT DOCUMENTS 0102934 5/1986
1347859 8/1970 United Kingdom .

OTHER PUBLICATIONS

Chemical Abstracts, vol. 111, No. 13, CA No. 114576H, Sep. 1989.
Rastogi, Ashtutosh: "Kinetics of Benzene Hydrogenation on Iron–Zeolite Catalyst", General of Indian Chem. Soc., vol. LXV, Dec. 1988, pp. 838-843.

Primary Examiner—Wayne A. Langel
Attorney, Agent, or Firm—Burns, Doane, Swecker & Mathis

[57] ABSTRACT

The invention relates to a process in the continuous catalytic hydrogenation step during production of hydrogen peroxide according to the anthraquinone process by alternate reduction and oxidation of a working soloution of alkylated anthraquinones, said working solution being supplied at the upper end of the hydrogenation reactor and uniformly distributed across the surface of the monolithic catalyst bed, while simultaneously introducing hydrogen gas or hydrogen gas-containing gas, the flow of said working solution through the catalyst bed being adjusted such that the liquid flow is lower than the falling rate of the liquid through the bed, whereby gas bubbles are formed which have a diameter close to the diameter of the catalyst channels, and whereby such gas plugs and corresponding liquid plugs alternately and automatically flow downwardly through said channels and a so-called plug flow is obtained.

11 Claims, 2 Drawing Sheets

PROCESS IN THE PRODUCTION OF HYDROGEN PEROXIDE

The present invention relates to a process in the production of hydrogen peroxide by alternate reduction and oxidation of alkylated anthraquinones, where anthraquinone solution and hydrogen gas are supplied to a reactor in such a manner that a so-called plug flow is obtained.

BACKGROUND

As a rule, hydrogen peroxide is produced by the so-called anthraquinone process by alternate reduction and oxidation of alkylated anthraquinones dissolved in suitable organic solvents. The solution of anthraquinones, the so-called working solution, is first treated with hydrogen gas in the presence of a catalyst in the so-called hydrogenation step. Then the working solution is conducted to the so-called oxidation step in which it is contacted with air or oxygen-containing gas to form hydrogen peroxide. One example of a reaction scheme for these hydrogenation and oxidation steps is

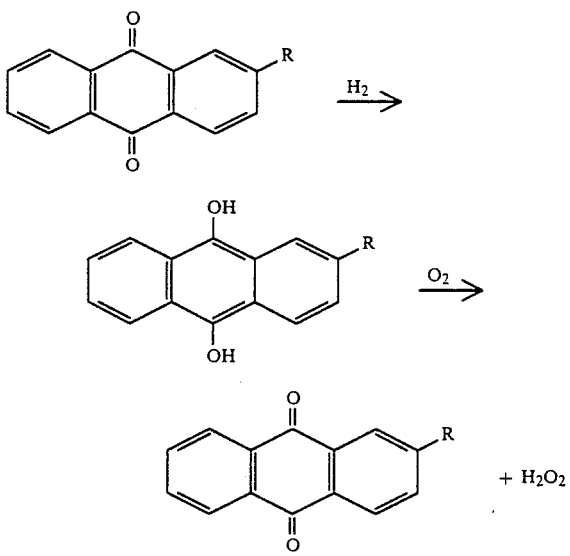

R = alkyl, e.g. $C_2H_5$

The hydrogen peroxide containing working solution is then usually conducted to a so-called extraction step in which the hydrogen peroxide is removed from the working solution by extraction with water, whereupon the working solution is recycled to the hydrogenation step for a further cycle of the above-mentioned reaction steps.

The hydrogenation is an important step of this continuous process, and a number of difficulties are here encountered. During hydrogenation there are high demands for a hiigh and uniform productivity, but also for the selectivity of the reaction to avoid secondary reactions that may prevent or aggravate the formation of hydrogen peroxide. The selectivity depends on a number of factors, among them the reaction degree of the anthraquinones, the hydrogenation temperature, the hydrogen gas pressure, the catalyst, and the flow conditions in the catalyst.

A common technique is hydrogenation with the catalyst in suspended form, whereby a good contact between the three reacting phases and thus high productivity and selectivity are obtained. Frequently, however, filtration difficulties arise with this technique when the finished hydrogenated solution is to be conducted to the next process step, in that the filters are easily blocked by, for example, catalyst particles, or in that leakage of particles occurs. The filters employed are usually expensive and require great care.

To avoid such filtration difficulties, the catalyst may be applied on a fixed bed, a so-called fixed bed hydrogenation. In this manner, the filtration difficulties are avoided, but the productivity and selectivity results will frequently be inferior to those obtained with suspended catalyst hydrogenation. The reason for this is an inferior contact between the three reacting phases because of an uneven flow distribution (so-called channeling) and a high pressure drop across the bed.

One way of improving the fixed bed hydrogenation is to arrange the fixed bed in the form of similar, parallel channels, a so-called monolithic fixed bed (see EP patent specification 102,934). In this manner, the contact between the three phases will be improved, the flow distribution will be more even, and the pressure drop lower.

TECHNICAL PROBLEM

The present invention relates to an improvement of the monolithic fixed bed hydrogenation where the hydrogen gas is usually supplied to the liquid phase in the form of small bubbles, for example via a so-called poral filter or an ejector. These bubbles are usually smaller than the channel diameter of the monolithic fixed bed, and the resulting flow type is called bubble flow; see FIG. 1a.

Figure 1B:
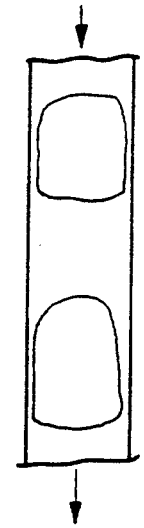

Theoretical calculations have shown that a so-called Taylor flow, i.e. large bubbles across practically the entire channel diameter, so-called gas plugs separated by liquid phase (see FIG. 1b), give a better mass transportation to and from the catalyst surface. The reason for the excellent mass transportation is the short diffusion distance from the gas phase via the thin liquid film to the catalyst surface, and high turbulence within the liquid plugs between the gas plugs.

Calculations show that the liquid plugs, in channels having a diameter of 1-3 mm, should have a length of some mm, maximally 10 mm, and that the gas plugs should have approximately the same length. For good mass transportation, the velocity within the channels should be at least 0.15 m/sec.

Figure 1C:
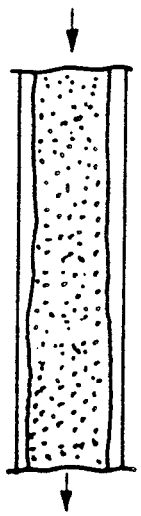

The difficult point so far has been to produce, in a convenient manner, a Taylor flow in larger reactors. A uniform supply of hydrogen gas bubbles of a diameter exceeding that of the channels is not readily established and, furthermore, may easily cause the bubbles to combine into an annular flow (see FIG. 1c) in which the liquid flows along the channel walls, while the centre of the channels is completely filled with gas. This type of flow results in a drastic reduction in productivity. In practical applications, it is quite impossible to establish an ideal Taylor flow according to a purely theoretical case, i.e. a flow which is entirely free of small bubbles and similar possible nonidealities, and therefore one must accept a so-called plug flow (see FIG. 1d) which is a flow where the liquid plugs surrounding the gas plugs contain small bubbles of the same type as in a bubble flow.

Figure 2:
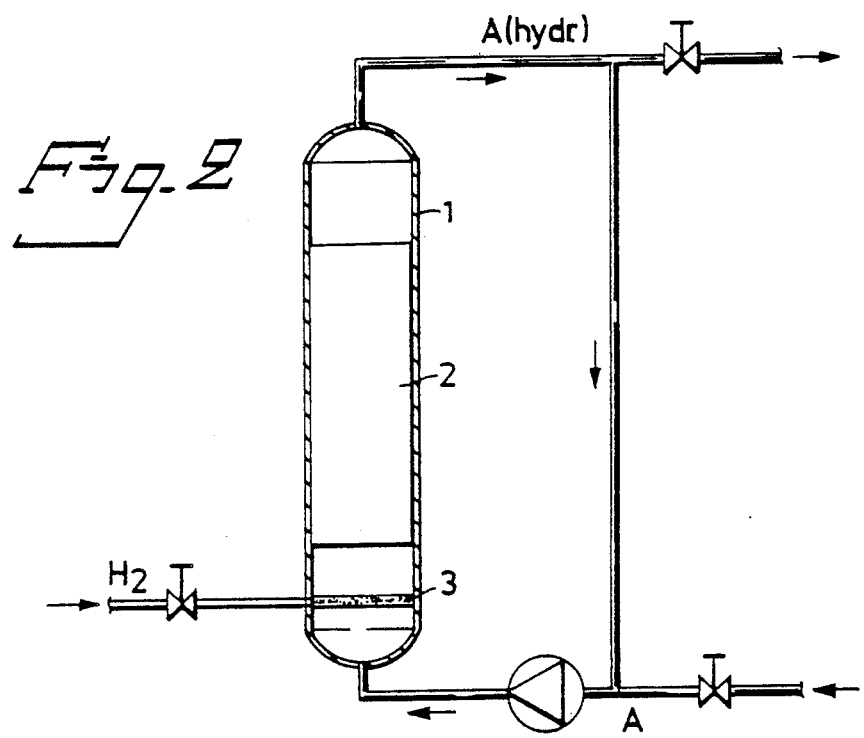

In prior art hydrogenation of anthraquinone solution with a fixed bed catalyst, the liquid was supplied at the reactor bottom and the hydrogen gas supplied immediately below the fixed bed catalyst via some distribution device, for example a poral filter, whereby a bubble flow is obtained. Fixed bed hydrogenation according to prior art technique is shown in FIG. 2. When trying to build such reactors in a larger scale, difficulties were encountered in obtaining a good distribution of hydrogen gas and liquid across the reactor cross-section, resulting in a lower catalyst activity and thus a lower productivity. When trying to change the flow configuration to larger bubbles, an alternate supply of gas and liquid by means of shuttle valves or reciprocating pumps may be employed, which is one way of establishing a plug flow, so far being used in research work only. However, it was found to be mechanically too complicated to adapt these supply techniques to large-scale applications in actual practice.

THE INVENTION

It has now surprisingly been found that an almost ideal plug flow is developed within the catalyst channels of the monolithic catalyst in a fixed bed hydrogenation reactor in the production of hydrogen peroxide if a carefully adjusted amount of liquid is supplied from above to the catalyst channels, and if also hydrogen gas is supplied. If the amount of liquid supplied is less than the amount flowing off under the action of gravity, gas will be admixed automatically. The liquid will then flow downwardly through the channels under the action of gravity, and the surrounding gas is carried along in a favourable manner, such that gas plugs, i.e. gas bubbles of a diameter close to that of the catalyst channels, and liquid plugs of suitable length are formed. In these tests, a falling rate of about 0.4 m/sec in the channels was obtained, which is more than enough for good mass transportation. The length of the liquid plugs and the gas plugs amounts to some mm. The fixed bed hydrogenation according to the invention is shown in FIG. 3.

The invention thus relates to a process in the production of hydrogen peroxide according to the anthraquinone process. The characteristic features of the invention are stated in the appended claims and imply that the anthraquinone-containing working solution, during hydrogenation at a temperature below 100° C. and a pressure below 1.5 MPa, is supplied at the upper end of a vertical monolithic fixed bed reactor and uniformly distributed across the surface of the catalyst bed, hydrogen gas or hydrogen gas-containing gas being supplied simultaneously, and the flow of the working solution being adjusted such that gas bubbles are formed having a diameter close to the diameter of the catalyst channels so that gas plugs and liquid plugs alternate in flowing downwardly through the channels.

It was found suitable to supply the liquid via a perforated plate having a suitable hole area and hole spacing, such that the liquid will be sprayed uniformly across the entire catalyst bed. The hydrogen gas is preferably supplied between the perforated plate and the catalyst bed.

Figure 3:
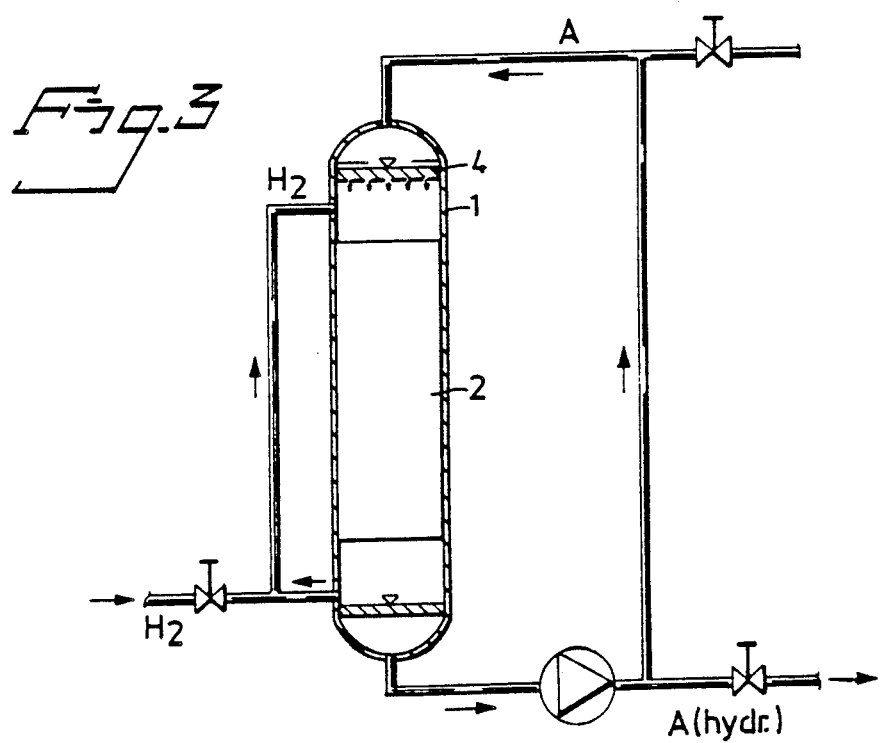

As shown in FIG. 3, unreacted hydrogen gas at the reactor bottom can be recycled to the upper part of the reactor via an external or internal connection. If the dynamic pressure drop in the return pipe is negligible, the total pressure within the reactor is constant because the dynamic pressure drop during downward flow is exactly balanced by the increasing static pressure. A constant pressure in the entire reactor is extremely advantageous because the reaction velocity increases with the increase in pressure, but if the pressure becomes too high, secondary reactions will rise to an unacceptable level. Since the pressure is constant, it can be set at a suitable level, such that the reaction velocity will be high throughout the reactor, but without inconvenient secondary reactions in any part of the reactor.

If the pressure drop in the return pipe is low, the falling rate is about 0.4 m/sec for liquid loads of from 0.4 m$^3$ liquid/m$^2$·sec. (i.e. 100% liquid and 0% gas) down to about 0.1 m$^3$ liquid/m$^2$·sec. (i.e. 25% liquid and 75% gas). If the liquid load is further reduced, the falling rate will decrease because the plug flow then becomes an annular flow. At the same time, the productivity is drastically reduced.

A suitable flow velocity is 0.4 m/sec, but if desired the velocity can be further reduced by throttling the hydrogen gas return pipe. A higher velocity is obtainable by pumping the gas from the bottom to the top, for example by means of a compressor or an ejector.

Owing to the fact that the hydrogen gas proportion can be maintained high throughout the reactor, there is no decrease in productivity when the reactor is run without exhaust gas flow, which is a vast improvement on prior art technique. The consumption of hydrogen gas will be very close to the one theoretically possible.

At the same time, the high proportion of hydrogen gas means a low proportion of working solution within the reactor, which also is an improvement on prior art technique since the amount of the relatively expensive working solution can be reduced.

Finally, the high gas proportion implies that the pumping power required for circulating the liquid can be reduced compared with the bubble flow technique since the falling rate is maintained in spite of a liquid flow as low as 0.1 m$^3$/m$^2$·sec.

A further significant advantage of the invention is that the high productivity of small-size reactors is maintained also in large-size reactors, which has so far not been possible because, with bubble flow technique, the distribution of gas and liquid became poorer in large reactors.

Figure 1D:
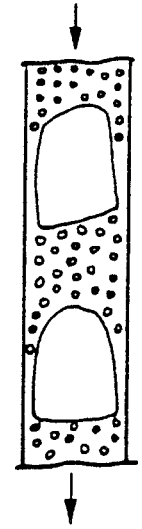

In the accompanying drawings comprising FIGS. 1–3, FIG. 1 illustrates the four different flow types referred to above, viz. bubble flow (FIG. 1a), Taylor flow (FIG. 1b), annular flow (FIG. 1c), and plug flow (FIG. 1d).

FIG. 2 illustrates a fixed bed hydrogenation according to prior art technique, and FIG. 3 a fixed bed hydrogenation according to the invention. A reactor 1 is shown which contains a fixed bed catalyst 2. FIG. 2 shows a distributing filter 3 and FIG. 3 a perforated plate 4. The hydrogen gas pipes are marked H$_2$, and the pipes conducting anthraquinone working solution are marked A for input solution and A(hydr.) for output solution.

The invention will now be described in more detail with reference to the following Examples which merely serve to illustrate, not to restrict the invention.

EXAMPLE 1

This Example shows the flow configuration in a channel of the fixed bed when gas and liquid are supplied in accordance with the invention.

Use was made of a simple test unit comprising a vertical glass tube, a burette containing anthraquinone working solution at the upper end of the glass tube, and a glass measure for flow determination at the lower end of the glass tube. The height of the glass tube, 200 mm, is the same as the height of real catalyst bed, and the diameter, 1.5 mm, corresponds to the channel of a real catalyst bed. The glass tube has an inner coating of silica to provide the same coefficient of friction as a real catalyst bed. The tests are conducted with a conventional anthraquinone working solution and air at room temperature. The results obtained are shown in the Table below.

TABLE I

| Downstream liquid flow ($m^3/m^2 \cdot s$) | Gas proportion (%) | Flow velocity (m/s) | Flow type |
|---|---|---|---|
| 0.43 | 0 | 0.43 | Pure liquid flow (1 phase) |
| 0.35 | 20 | 0.44 | Incipient plug flow |
| 0.33 | 38 | 0.53 | Plug flow |
| 0.24 | 43 | 0.42 | Plug flow |
| 0.19 | 45 | 0.42 | Plug flow |
| 0.09 | 75 | 0.36 | Abating plug flow (partial annular flow) |
| 0.04 | 85 | 0.27 | Annular flow (gas flow proportion estimated visually) |

Table I shows that, at a liquid load of less than 0.1 $m^3/m^2 \cdot sec$, the plug flow becomes unstable and may turn into an annular flow.

EXAMPLE 2

This Example shows that the productivity in a reactor having a catalyst volume of 50 l was improved when running was changed from upstream bubble flow to downstream plug flow.

An anthraquinone-containing working solution was introduced into a vertical reactor, on the one hand in accordance with the invention and, on the other hand, in accordance with prior art technique. The reactor contained a monolithic fixed bed catalyst of the above volume, a channel diameter of 1.5 mm, and a channel length of 200 mm. In both cases, hydrogen gas was introduced. With bubble flow operation, different pressures prevail at the bottom and the top of the reactor, the Table showing the mean pressure. With plug flow operation, the pressure is the same throughout the reactor. The measured productivity is given in kg hydrogen peroxide per $m^3$ catalyst bed and hour. The results obtained are shown in the Table below.

TABLE II

| Flow type | Pressure (mean) (kPa) | Temp. (°C.) | Liquid flow ($m^3/m^2 \cdot s$) | Productivity ($kg/m^3 \cdot h$) | Duration of test (days) |
|---|---|---|---|---|---|
| Upstream bubble flow | 400 | 52 | 0.15–0.20 | 100 | 10 |
| Downstream plug flow | 400 | 52 | 0.15–0.20 | 133 | 10 |

The results obtained show a far higher productivity for plug flow according to the invention.

EXAMPLE 3

This Example shows that bubble flow operation according to prior art technique in a reactor having a catalyst volume of 1000 l gives a far lower productivity than in the smaller reactor according to Example 2 having a catalyst volume of 50 l.

The Example also shows that, if the reactors are designed in accordance with the invention, the productivity in the large reactor is only slightly reduced as compared with the high productivity in the small reactor.

The tests with the small reactor were carried out in accordance with Example 2. The tests with the larger reactor were conducted in analogous manner in a reactor adjusted to the larger catalyst volume, and also this catalyst had a channel diameter of 1.5 mm and a channel length of 200 mm and a far larger bed area.

The results obtained are shown in the Table below.

TABLE III

| Flow type | Pressure (mean) (kPa) | Temp. (°C.) | Liquid flow ($m^3/m^2 \cdot s$) | Productivity ($kg/m^3 \cdot h$) | Duration of test (days) |
|---|---|---|---|---|---|
| Upstream bubble flow (50 l) | 400 | 52 | 0.16 | 100 | 10 |
| Upstream bubble flow (1000 l) | 400 | 52 | 0.16 | 64 | 30 |
| Downstream plug flow (50 l) | 400 | 52 | 0.16 | 133 | 10 |
| Downstream plug flow (1000 l) | 400 | 52 | 0.16 | 124 | 30 |

The results show that upscaling of a bubble flow reactor gives a significantly lower productivity, whereas the productivity of a plug flow reactor according to the invention, which is more favourable already on a reduced scale, is only slightly reduced upon upscaling.

I claim:

1. A process for the production of hydrogen peroxide according to the anthraquinone process by alternate reduction and oxidation of a working solution of alkylated anthraquinones, the hydrogenation of said working solution being conducted continuously with hydrogen gas or hydrogen gas-containing gas in a vertical monolithic fixed bed reactor at a temperature below 100° C. and a pressure below 1.5 MPa, wherein said working solution is supplied at the upper end of the reactor and uniformly distributed across the surface of the catalyst bed, while simultaneously introducing hydrogen gas or hydrogen gas-containing gas to the upper end of the reactor, the flow of said working solution through the catalyst bed being adjusted such that the liquid flow is lower than the falling rate of the liquid through the bed, whereby gas plugs are formed which have a diameter close to the diameter of the catalyst channels, and whereby said gas plugs and corresponding liquid plugs alternately and automatically flow downwardly through said channels and a plug flow is obtained.

2. A process as claimed in claim 1, wherein the working solution is uniformly distributed across the catalyst bed by means of a perforated plate.

3. A process as claimed in claim 2, wherein the hydrogen gas is supplied to the reactor between the perforated plate and the upper end of the catalyst bed.

4. A process as claimed in claim 3, wherein the flow velocity of the working solution is 0.1–0.4 m$^3$/m$^2$·s.

5. A process as claimed in claim 2, wherein the flow velocity of the working solution is 0.1–0.4 m$^3$/m$^2$·s.

6. A process as claimed in claim 1 wherein the hydrogen gas is supplied to the reactor between a perforated plate and the upper end of the catalyst bed.

7. A process as claimed in claim 6, wherein the flow velocity of the working solution is 0.1–0.4 m$^3$/m$^2$·s.

8. A process as claimed in claim 1 wherein the flow velocity of the working solution is 0.1–0.4 m$^3$/m$^2$·s.

9. A process as claimed in claim 1, wherein unreacted hydrogen gas from the lower part of the reactor is recycled to the upper part thereof via an external or internal connection.

10. A process as claimed in claim 9, wherein the flow velocity of the working solution is reduced by throttling the recycled gas flow in a return pipe.

11. A process as claimed in claim 9, wherein the flow velocity of the working solution is increased by pumping the gas back in a return pipe.

* * * * *